US011582019B2

(12) United States Patent
Kim et al.

(10) Patent No.: US 11,582,019 B2
(45) Date of Patent: Feb. 14, 2023

(54) RECEIVING APPARATUS, RECEIVING METHOD AND PROGRAM

(71) Applicant: NIPPON TELEGRAPH AND TELEPHONE CORPORATION, Tokyo (JP)

(72) Inventors: Sang-Yuep Kim, Musashino (JP); Takahiro Suzuki, Musashino (JP); Junichi Kani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 79 days.

(21) Appl. No.: 17/292,856

(22) PCT Filed: Oct. 9, 2019

(86) PCT No.: PCT/JP2019/039819
§ 371 (c)(1),
(2) Date: May 11, 2021

(87) PCT Pub. No.: WO2020/110471
PCT Pub. Date: Jun. 4, 2020

(65) Prior Publication Data
US 2021/0399869 A1     Dec. 23, 2021

(30) Foreign Application Priority Data
Nov. 29, 2018    (JP) .............................. JP2018-223518

(51) Int. Cl.
*H04L 7/00*        (2006.01)
*H04L 27/38*     (2006.01)
*H04B 10/61*     (2013.01)

(52) U.S. Cl.
CPC .......... *H04L 7/0033* (2013.01); *H04L 7/0079* (2013.01); *H04L 27/38* (2013.01); *H04B 10/61* (2013.01); *H04L 7/0075* (2013.01)

(58) Field of Classification Search
CPC ...... H04L 7/0033; H04L 7/0079; H04L 27/38
See application file for complete search history.

(56) References Cited

U.S. PATENT DOCUMENTS

| 5,142,529 | A | * | 8/1992 | Parruck | ................. | H04J 3/0623 |
| 2008/0159423 | A1 | * | 7/2008 | Omoto | ................ | H04L 27/2698 |

OTHER PUBLICATIONS

Matthias Seimetz, "Laser Linewidth Limitations for Optical Systems with High-Order Modulation Employing Feed Forward Digital Carrier Phase Estimation," Optical Fiber Communication Conference and National Fiber Optic Engineers Conference (OFC/NFOEC) 2008, paper OTuM2, Feb. 24, 2008.

(Continued)

*Primary Examiner* — Ronald B Abelson
(74) *Attorney, Agent, or Firm* — Harness, Dickey & Pierce, P.L.C.

(57) ABSTRACT

A reception apparatus includes a detection unit that detects occurrence of a phase slip in phase estimation values of time-series received symbol data, and determines an inclination of the phase slip, a delay processing unit that generates first received signal data obtained by delaying received signal data obtained from the time-series received symbol data by one symbol time interval, a phase shift unit that generates second received signal data by performing phase shift according to the inclination, only in a period in which one symbol time interval elapses, on only the received signal data of a symbol time at which the occurrence of the phase slip is detected among pieces of the received signal data, and a remainder processing unit that derives a remainder of a difference between the second received signal data and the first received signal data.

7 Claims, 7 Drawing Sheets

(56) References Cited

OTHER PUBLICATIONS

T. Suzuki, S. Kim, J. Kani, K. I. Suzuki, A. Otaka, T. Hanawa, "Parallelization of Cipher Algorithm on CPU/GPU for Real-time Software-Defined Access Network", 2015 Asia-Pacific Signal and Information Processing Association Annual Summit and Conference (APSIPA), pp. 484-487, 2015.

* cited by examiner

| TIME | t0 | t1 | t2 | ... | t3 | t4 | t5 |
|------|------|------|------|-----|------|------|------|
| $\theta e$ | $+\pi/8$ | $-\pi/4$ | $-\pi/8$ | ... | $-\pi/8$ | $+\pi/4$ | $+\pi/8$ |
| I(n) | 0 | +1 | 0 | ... | 0 | -1 | 0 |

RECEIVING APPARATUS, RECEIVING METHOD AND PROGRAM

CROSS-REFERENCE TO RELATED APPLICATIONS

This application is a 371 U.S. National Phase of International Application No. PCT/JP2019/039819 filed on Oct. 9, 2019, which claims priority to Japanese Application No. 2018-223518 filed on Nov. 29, 2018. The entire disclosures of the above applications are incorporated herein by reference.

TECHNICAL FIELD

The present disclosure relates to a reception apparatus, a reception method, and a program.

BACKGROUND ART

In a digital communication system that executes M-ary phase shift keying (M-PSK), an unnecessary phase component corresponding to characteristics of oscillation units of a transmission apparatus and a reception apparatus may be generated in symbol data received by the reception apparatus (hereinafter, referred to as "received symbol data"). The reception apparatus may estimate the unnecessary phase component by a Viterbi and Viterbi (V&V) method of raising a complex amplitude of the received symbol data to an M-th power, and may remove the unnecessary phase component from the received symbol data (see Non Patent Document 1). An optical coherent communication system executes differential coding and differential decoding of the symbol data. In recent years, a technology for implementing the transmission apparatus and the reception apparatus as software by general-purpose processors such as a central processing unit (CPU) and a graphics processing unit (GPU) has been attracting attention due to high performance of the general-purpose processors (see Non Patent Document 2).

CITATION LIST

Non Patent Documents

Non Patent Document 1: Matthias Seimetz, "Laser Linewidth Limitations for Optical Systems with High-Order Modulation Employing Feed Forward Digital Carrier Phase Estimation," Optical Fiber Communication Conference and National Fiber Optic Engineers Conference (OFC/NFOEC) 2008, paper OTuM2, 24 Feb. 2008.

Non Patent Document 2: T. Suzuki, S. Kim, J. Kani, K. I. Suzuki, A. Otaka, T. Hanawa, "Parallelization of Cipher Algorithm on CPU/GPU for Real-time Software-Defined Access Network", 2015 Asia-Pacific Signal and Information Processing Association Annual Summit and Conference (APSIPA), pp. 484-487, 2015.

SUMMARY OF THE INVENTION

Technical Problem

In the Viterbi and Viterbi method, a phase ambiguity occurs by the processing of raising the complex amplitude of the received symbol data to the M-th power. Due to the phase ambiguity, a phase slip occurs in the phase estimation value of the received symbol data, and phase estimation values of time-series received symbol data become discontinuous. Thus, an estimable range of the phase estimation value of the received symbol data is limited. Accordingly, an error is caused in an output signal of the reception apparatus. For example, for quadrature phase shift keying (QPSK), the estimable range of the phase estimation value is limited to a range of "$-\pi/4$ to $+\pi/4$" ("$\pi$" indicates a circumferential rate). Phase unwrapping or segment changing processing is executed in a reception apparatus of the related art using the Viterbi and Viterbi method to eliminate this limitation and enable the differential decoding of the received symbol data.

However, when the phase unwrapping or segment changing processing of making continuous the phase estimation values of the time-series received symbol data is executed, sequential arithmetic operations need to be executed on all pieces of received symbol data. Thus, it is difficult to execute the phase unwrapping or segment changing processing using parallelized general-purpose processors such as a CPU and a GPU. As stated above, the reception apparatus of the related art executes the sequential arithmetic operations of making continuous the phase estimation values on all the pieces of received symbol data and thus has a problem that it is difficult to increase a speed of the decoding processing due to the parallel processing of the general-purpose processors.

In view of the aforementioned circumstances, an object of the present disclosure is to provide a reception apparatus (receiving apparatus), a reception method (receiving method), and a program capable of eliminating a limitation of an estimable range of a phase estimation value without making continuous phase estimation values of received symbol data by executing phase shift processing on only a part of received signal data by a differential decoding unit.

Means for Solving the Problem

An aspect of the present disclosure is a reception apparatus including a detection unit configured to detect occurrence of a phase slip in a phase estimation value of time-series received symbol data, and determine an inclination of the phase slip, a delay processing unit configured to generate first received signal data obtained by delaying received signal data obtained from the time-series received symbol data by one symbol time interval, a phase shift unit configured to generate second received signal data obtained by performing phase shift according to the inclination, only in a period in which one symbol time interval elapses, on only the received signal data of a symbol time at which the occurrence of the phase slip is detected among pieces of the received signal data obtained from the time-series received symbol data, and a remainder processing unit configured to derive a remainder of a difference between the second received signal data and the first received signal data.

Another aspect of the present disclosure is a reception apparatus including a determination unit configured to generate received signal data by performing quadrature amplitude modulation (QAM) symbol determination on time-series received symbol data generated from a QAM signal, a detection unit configured to detect occurrence of a phase slip in a phase estimation value of the received symbol data, a mapper unit configured to generate QAM phase slip detection information corresponding to a shift phase value for a phase-slipped constellation point based on the received signal data and information indicating the occurrence of the phase slip detected by the detection unit, a delay processing unit configured to generate first received signal data obtained by delaying the received signal data by one symbol time interval, a phase shift unit configured to generate phase-shifted second received signal data by adding the QAM phase slip detection information to only the received signal data of a symbol time at which the occurrence of the phase slip is detected only in a period in which one symbol time interval elapses, and a remainder processing unit configured to derive a remainder of a difference between the second received signal data and the first received signal data.

Still another aspect of the present disclosure is a reception method executed by a reception apparatus. The method includes detecting occurrence of a phase slip in a phase estimation value of time-series received symbol data, and determining an inclination of the phase slip, generating first received signal data obtained by delaying received signal data obtained from the time-series received symbol data by one symbol time interval, generating second received signal data obtained by performing phase shift according to the inclination, only in a period in which one symbol time interval elapses, only on the received signal data of a symbol time at which the occurrence of the phase slip is detected among pieces of the received signal data obtained from the time-series received symbol data, and deriving a remainder of a difference between the second received signal data and the first received signal data.

Still another aspect of the present disclosure is a reception method including generating received signal data by performing quadrature amplitude modulation (QAM) symbol determination on time-series received symbol data generated from a QAM signal, detecting occurrence of a phase slip in a phase estimation value of the received symbol data, generating QAM phase slip detection information corresponding to a shift phase value for a phase-slipped constellation point based on the received signal data and information indicating the occurrence of the phase slip, generating first received signal data obtained by delaying the received signal data by one symbol time interval, generating phase-shifted second received signal data by adding the QAM phase slip detection information to only the received signal data of a symbol time at which the occurrence of the phase slip is detected only in a period in which one symbol time interval elapses, and deriving a remainder of a difference between the second received signal data and the first received signal data.

Still another aspect of the present disclosure is a program causing a computer to operate as functional units included in the aforementioned reception apparatus.

Effects of the Invention

According to the present disclosure, it is possible to eliminate the limitation of the estimable range of the phase estimation value without making continuous the phase estimation values of the received symbol data by executing the phase shift processing only on a part of the received signal data in the differential decoding unit. Accordingly, it is possible to increase the speed of the decoding processing due to the parallel processing of the general-purpose processors.

DESCRIPTION OF EMBODIMENTS

Embodiments of the present disclosure will be described in detail with reference to the drawings.

First Embodiment

Figure 1:
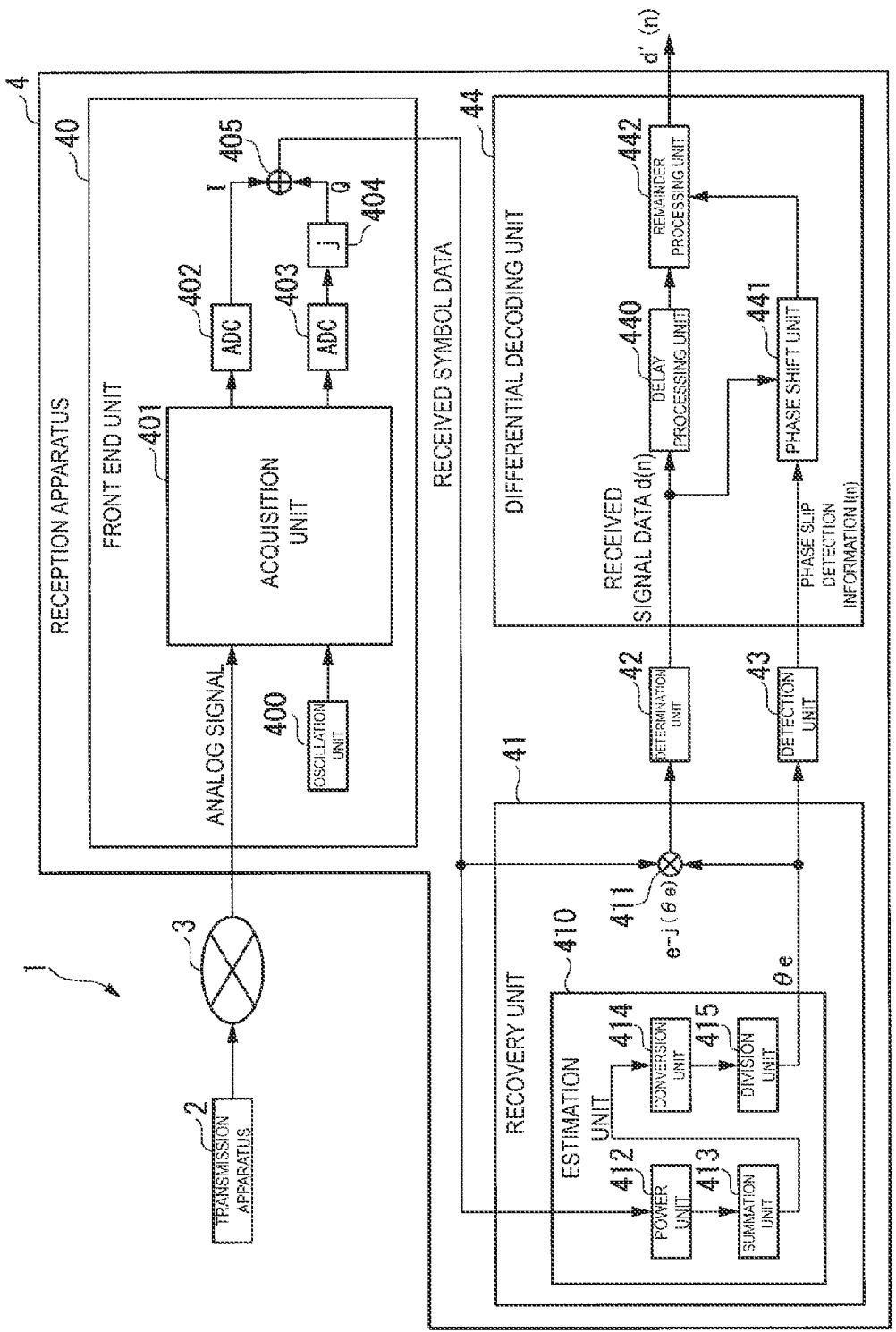
FIG. 1 is a diagram illustrating a configuration example of a communication system according to a first embodiment.

FIG. 1 is a diagram illustrating a configuration example of a communication system 1. The communication system 1 is a digital communication system that executes M-ary phase shift keying. The communication system 1 includes a transmission apparatus 2, a communication line 3, and a reception apparatus 4.

The transmission apparatus 2 is an apparatus configured to transmit an analog signal on which the M-ary phase shift keying is executed. The analog signal to be transmitted may be either a wireless signal or a wired signal. The communication line 3 transmits the analog signal transmitted from the transmission apparatus 2 to the reception apparatus 4. The communication line 3 may be, for example, a wireless communication line or a wired communication line. The communication line 3 is, for example, a coaxial cable in the case of the wired communication line.

The reception apparatus 4 (receiving apparatus) is an apparatus that receives the analog signal on which the M-ary phase shift keying is executed. The analog signal indicates received symbol data. The reception apparatus 4 estimates an unnecessary phase component by a Viterbi and Viterbi method (power method) of raising a complex amplitude of the received symbol data to an M-th power, and removes the estimated unnecessary phase component from the received symbol data. Note that, the reception apparatus 4 may not execute phase unwrapping or segment changing processing for making continuous phase estimation values of time-series received symbol data.

The reception apparatus 4 includes a front end unit 40, a recovery unit 41, a determination unit 42, a detection unit 43, and a differential decoding unit 44. A part or all of the functional units of the reception apparatus 4 may be implemented by a computer including a general-purpose processor such as a central processing unit (CPU) or a graphics processing unit (GPU) executing a program stored in a storage unit. Alternatively, the functional units may be implemented by using dedicated hardware such as a programmable logic device such as a field programmable gate array (FPGA), a large scale integration (LSI), or an application specific integrated circuit (ASIC). The computer is a concept that includes the reception apparatus.

The front end unit 40 receives the analog signal transmitted from the transmission apparatus 2. Hereinafter, the analog signal received as described above is referred to as a "received analog signal". The front end unit 40 generates received symbol data from the received analog signal. The received symbol data includes an unnecessary phase component.

The front end unit 40 includes an oscillation unit 400, an acquisition unit 401, an ADC 402, an ADC 403, a complex processing unit 404, and a combination unit 405. The oscillation unit 400 outputs a signal having a predetermined frequency to the acquisition unit 401. The acquisition unit 401 generates a received analog signal of an in-phase component and a received analog signal of a quadrature component by multiplexing the signal having the predetermined frequency and the received analog signal.

The ADC 402 (analog-to-digital converter) generates a digital signal of the in-phase component from the received analog signal of the in-phase component (I-component). The ADC 403 generates a digital signal of the quadrature component from the received analog signal of the quadrature component (Q component). The complex processing unit 404 multiplies the digital signal of the quadrature component by an imaginary unit "j". Accordingly, the complex processing unit 404 generates a digital signal of the quadrature component multiplied by the imaginary unit "j". The combination unit 405 generates a received symbol data corresponding to the received analog signal by combining the digital signal of the in-phase component and the digital signal of the quadrature component multiplied by the imaginary unit "j".

The recovery unit 41 executes processing (carrier recovery processing) of removing the unnecessary phase component from the received symbol data. The recovery unit 41 may not execute the phase unwrapping or segment changing processing. Hereinafter, a time at which each received symbol data is received is referred to as a "symbol time: t", an interval between the symbol times is referred to as a "symbol time interval: Ts", and information indicating a detection result of a phase slip is referred to as "phase slip detection information: l".

Figure 2:
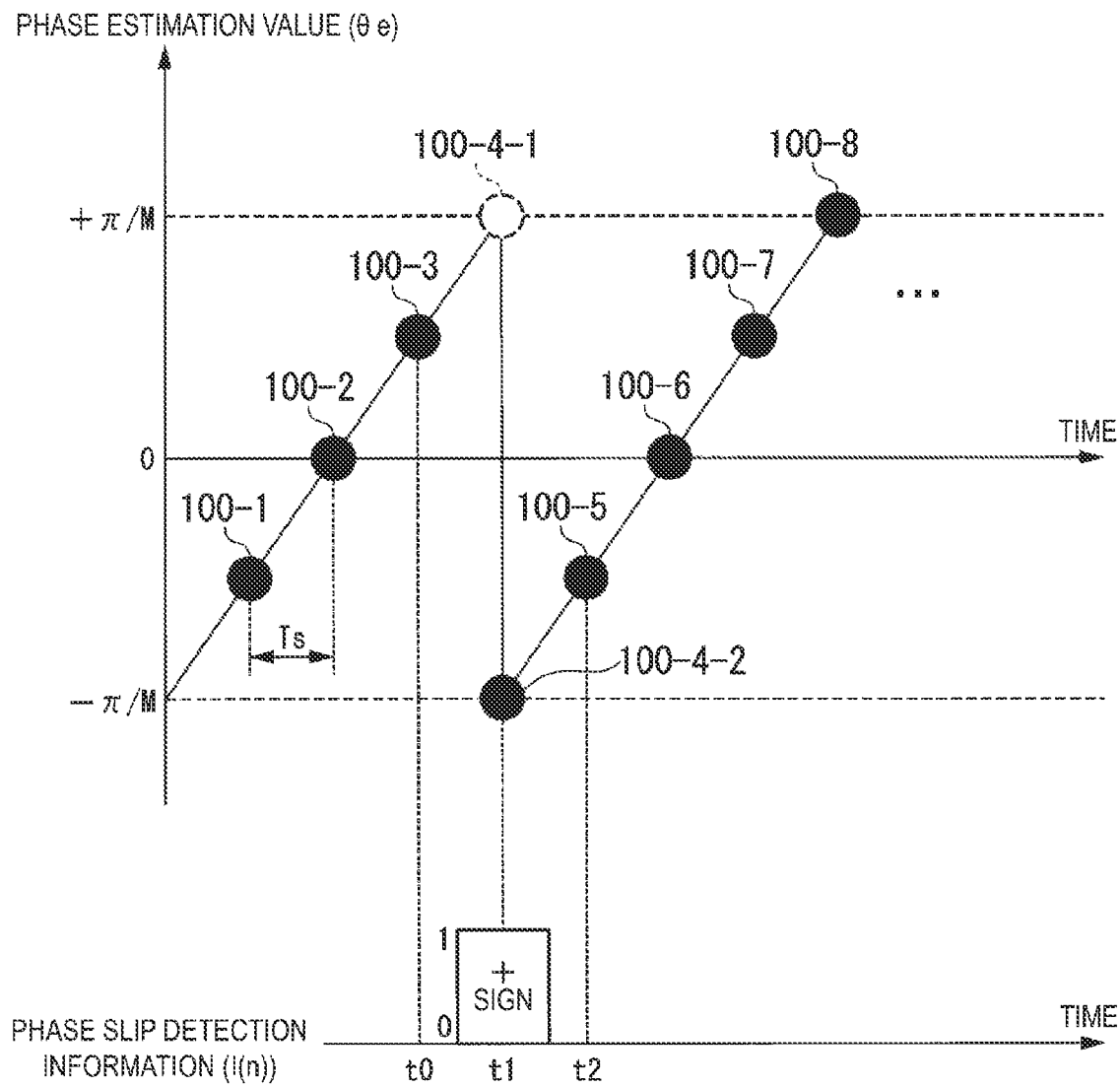
FIG. 2 is a diagram illustrating a first example of a relationship between a phase estimation value and phase slip detection information according to the first embodiment.

FIG. 2 is a diagram illustrating a first example of a relationship between the phase estimation value and the phase slip detection information. A horizontal axis indicates the time. A vertical axis indicates the phase estimation value "θe" of the received symbol data of the M-ary phase shift keying. "M" of the M-ary phase shift keying is the number of values expressible by one piece of received symbol data, and is, for example, four. Each of marks 100-1 to 100-8 indicates the phase estimation value "θe" of the received symbol data for each symbol time.

In FIG. 2, the phase estimation value periodically increases over time. In FIG. 2, at a symbol time "t1", a phase slip occurs between a mark 100-4-1 indicating a correct phase estimation value "−π/M" to be used in decoding processing and a mark 100-4-2 indicating an incorrect phase estimation value "−π/M". A value of the phase slip, that is, a difference between the correct phase estimation value of the mark 100-4-1 "+π/M", and the incorrect phase estimation value of the mark 100-4-2 "−π/M" is "2π/M". All the phase estimation values after the symbol time "t1" at which the phase slip occurs are changed by "2π/M", and the phase estimation values become discontinuous. In this example, a sign of a mark 100-3 is positive and a sign of the mark 100-4-2 is negative for phase estimation values "θe" of a plurality of pieces of received symbol data continuous in time series, and thus, an inclination of the phase slip in FIG. 2 is determined to be a "positive value".

Figure 3:
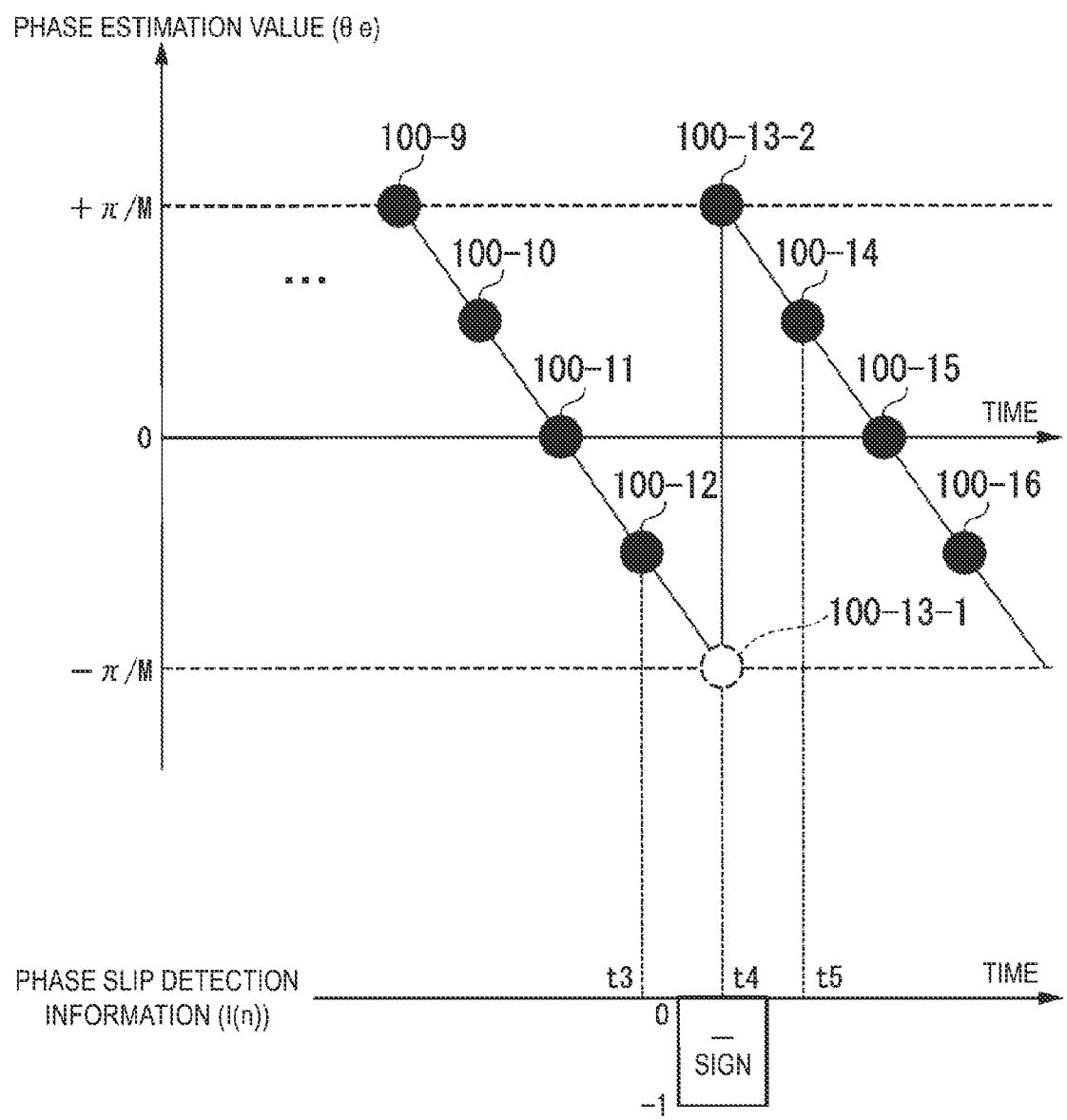
FIG. 3 is a diagram illustrating a second example of a relationship between the phase estimation value and the phase slip detection information according to the first embodiment.

FIG. 3 is a diagram illustrating a second example of the relationship between the phase estimation value and the phase slip detection information. A horizontal axis indicates the time. A vertical axis indicates the phase estimation value "θe" of the received symbol data of the M-ary phase shift keying. Each of marks 100-9 to 100-16 indicates the phase estimation value of the received symbol data for each symbol time.

In FIG. 3, the phase estimation value periodically decreases over time. In FIG. 3, at a symbol time "t4", a phase slip occurs between a mark 100-13-1 indicating a correct phase estimation value "−π/M" to be used in the decoding processing and a mark 100-13-2 indicating an incorrect phase estimation value "+π/M". A value of the phase slip, that is, a difference between the correct phase estimation value of the mark 100-13-1 "−π/M" and the incorrect phase estimation value of the mark 100-13-2 "+π/M" is "2π/M". All the phase estimation values after the symbol time "t4" at which the phase slip occurs are changed by "2π/M", and the phase estimation values become discontinuous. In this example, a sign of the mark 100-12 is negative and a sign of the mark 100-13-2 is positive for the phase estimation values "θe" of the plurality of pieces of received symbol data continuous in time series, and thus, an inclination of the phase slip in FIG. 3 is determined to be a "negative value".

Referring back to FIG. 1, the configuration example of the communication system 1 will be continuously described. The recovery unit 41 removes the unnecessary phase component from the received symbol data by the Viterbi and Viterbi method of raising the complex amplitude of the received symbol data to the M-th power.

The recovery unit 41 includes an estimation unit 410 and a multiplication unit 411. The estimation unit 410 derives the phase estimation value "θe" of the received symbol data to remove the unnecessary phase component included in the received symbol data. An estimable range of the phase estimation value "θe" is limited to a predetermined range. For example, for quadrature phase shift keying (M=4), the estimable range of the phase estimation value is limited to a range of "−π/4 to +π/4". Note that, the estimation unit 410 may not execute the phase unwrapping or segment changing processing.

The multiplication unit 411 acquires the phase estimation value "θe" from the estimation unit 410. The multiplication unit 411 acquires the received symbol data from the front end unit 40. The multiplication unit 411 multiplies the received symbol data by a complex number "exp(−jθe)". That is, the multiplication unit 411 rotates a constellation of the received symbol data about an origin on a complex plane by using the complex number "exp(−jθe)". Accordingly, the multiplication unit 411 removes the unnecessary phase component from the received symbol data. However, the phase slip remains in the received symbol data from which the unnecessary phase component is removed. The multiplication unit 411 outputs, to the determination unit 42, the received symbol data from which the unnecessary phase component is removed.

A configuration example of the estimation unit 410 will be described. The estimation unit 410 includes a power unit 412, a summation unit 413, a conversion unit 414, and a division unit 415. The power unit 412 acquires the received symbol data from the front end unit 40. The power unit 412 raises the complex amplitude of the received symbol data to the M-th power. The summation unit 413 derives a sum of complex amplitudes of N pieces of M-raised received symbol data to perform interval averaging processing.

The conversion unit 414 converts the sum of the complex amplitudes of the N pieces of M-raised received symbol data into a phase on the complex plane. The division unit 415 divides the phase of the complex amplitudes of the pieces of received symbol data by "M". The division unit 415 outputs, to the multiplication unit 411 and the detection unit 43, time-series phase estimation values "θe" including the phase estimation values "θe" of the symbol times at which the phase estimation values become discontinuous by the phase slip.

The determination unit 42 acquires, from the multiplication unit 411, the received symbol data from which the unnecessary phase component is removed. The determination unit 42 executes identification processing (symbol determination processing) on the received symbol data from which the unnecessary phase component is removed. That is, the determination unit 42 generates received signal data "d(n)" which is data associated with the M-ary received symbol data in advance. Here, "n" indicates an index of the symbol time, and the received signal data "d(n)" is expressed in, for example, a decimal number. The determination unit 42 outputs the generated received signal data to the differential decoding unit 44.

The detection unit 43 is arranged downstream of the recovery unit 41 in a flow direction of the received signal data. The detection unit 43 acquires the phase estimation value "θe" from the recovery unit 41. The detection unit 43 detects the phase slip occurring in the phase estimation value of the time-series received symbol data based on the phase estimation value "θe". The detection unit 43 generates phase slip detection information "l(n)" for each symbol time based on the phase estimation value "θe" of each symbol time.

The detection unit 43 determines the inclination of the phase slip based on the signs of the phase estimation values of the plurality of pieces of received symbol data including the pieces of received symbol data of the symbol time at which the occurrence of the phase slip is detected and the immediately previous symbol time. When the signs of the phase estimation values "θe" of two pieces of received symbol data continuous in time series are changed from positive to negative due to the occurrence of the phase slip, the detection unit 43 determines that the inclination of the phase slip is a "positive value". When the signs of the phase estimation values "θe" of two pieces of received symbol data continuous in time series are changed from negative to positive due to the occurrence of the phase slip, the detection unit 43 determines that the inclination of the phase slip is a "negative value".

Figures 4, 5:
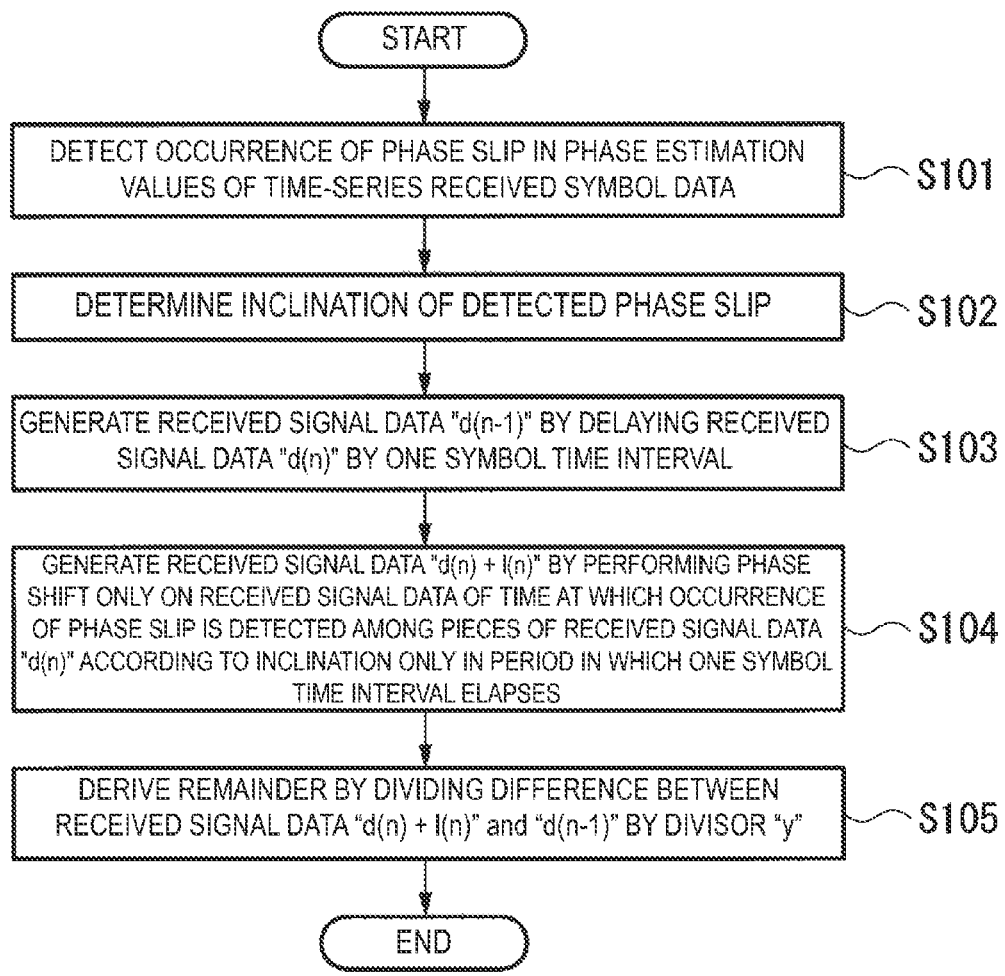
FIG. 4 is a diagram illustrating an example of phase slip detection information of QPSK according to the first embodiment.
FIG. 5 is a flowchart illustrating an operation example of the communication system according to the first embodiment.

FIG. 4 is a diagram illustrating an example of the phase slip detection information (M=4) of QPSK. In the phase slip detection information "l(n)", "n" indicates the index of the symbol time. When the phase estimation values "θe" of two pieces of received symbol data continuous in time series are changed by a predetermined threshold value or more, for example, a value equal to or greater than "π/4" which is ½ of the phase slip value "π/2" of QPSK, the detection unit 43 determines that the phase slip occurs in the phase estimation values of the time-series received symbol data. Hereinafter, a determination example of the phase slip occurrence in QPSK will be described.

In FIG. 4, the phase estimation values are changed from positive to negative by a threshold value "π/4" or more like "π/8+π/4=3π/8" between a symbol time "t0" (phase estimation value "θe=(+π/8)") and a symbol time "t1" (phase estimation value "θe=(−π/4)"). Thus, the detection unit 43 determines that the phase slip with the inclination of the positive value occurs in the phase estimation values of the two pieces of received symbol data continuous in time series.

In FIG. 4, the phase estimation values are changed from negative to positive by a threshold value "π/4" or more like "π/8+π/4=3π/8" between a symbol time "t3" (phase estimation value "θe=(−π/8)") and a symbol time "t4" (phase estimation value θe=(+π/4)"). Thus, the detection unit 43 determines that the phase slip with the inclination of the negative value occurs in the phase estimation values of the time-series received symbol data.

The detection unit 43 outputs, to the differential decoding unit 44, the phase slip detection information "l(n)" including a value "0" indicating that the phase slip does not occur, a value "+1" indicating that the inclination of the phase slip is a positive value, and a value "−1" indicating that the inclination of the phase slip is a negative value. Here, a period in which the phase slip detection information "l(n)" is "+1" or "−1" is a period until one symbol time interval "Ts" elapses from a symbol time at which the occurrence of the phase slip is detected.

Referring back to FIG. 1, the configuration example of the communication system 1 will be continuously described. The differential decoding unit 44 executes differential decoding processing on the received signal data "d(n)" which is a main signal. The differential decoding unit 44 includes a delay processing unit (delay processor) 440, a phase shift unit (phase shifter) 441, and a remainder processing unit (remainder processor) 442. The delay processing unit 440 and the remainder processing unit 442 constitute a first pass of the received signal data "d(n)" which is the main signal in the differential decoding unit 44. The phase shift unit 441 and the remainder processing unit 442 constitute a second pass of the received signal data "d(n)" which is the main signal in the differential decoding unit 44.

The delay processing unit 440 acquires the received signal data "d(n)" from the determination unit 42. The delay processing unit 440 delays the acquired received signal data "d(n)" by one symbol time interval "Ts". The delay processing unit 440 outputs a delayed received signal data "d(n−1)" to the remainder processing unit 442.

The phase shift unit 441 acquires the phase slip detection information "l(n)" from the detection unit 43. The phase shift unit 441 acquires the received signal data "d(n)" from the determination unit 42. The phase shift unit 441 executes a phase shift arithmetic operation at a bit level.

Among the time-series received signal data "d(n)", the phase shift unit 441 performs phase shift on only the received signal data "d(n)" in which the phase slip occurs at the bit level based on the phase slip detection information "l(n)" only in a period in which one symbol time interval "Ts" elapses. That is, the phase shift unit 441 rewrites the received signal data "d(n)" obtained from the received symbol data to received signal data "d(n)+l(n)".

When the phase slip does not occur in the phase estimation value, a value of "l(n)" is "0", and thus, the phase shift unit 441 does not perform phase shift on bit data of the received signal data "d(n)" in which the phase slip does not occur.

When the value of "l(n)" is "+1", the phase shift unit 441 performs phase shift only in a period in which one symbol time interval "Ts" elapses by rewriting only the received signal data "d(n)" in which the phase slip occurs to bit data corresponding to the shift phase value "+2π/M". When the value of "l(n)" is "−1", the phase shift unit 441 performs phase shift only in a period in which one symbol time interval "Ts" elapses by rewriting only the received signal data "d(n)" in which the phase slip occurs to bit data corresponding to the shift phase value "−2π/M".

In the example of FIG. 2, the phase shift unit 441 performs phase shift corresponding to a phase value "+2π/M" at the bit level on only the received signal data "d(n)" of the mark 100-4-2 only in a period in which one symbol time interval "Ts" elapses at the symbol time "t1" at which the phase slip detection information "l(n)" is "+1" according to the sign "positive value" of "+1" indicating the inclination of the phase slip.

In the example of FIG. 3, the phase shift unit 441 performs phase shift corresponding to a phase value "−2π/M" at the bit level on only the received signal data "d(n)" of the mark 100-13-2 only in a period in which one symbol time interval "Ts" elapses at the symbol time "t4" at which the phase slip detection information "l(n)" is "−1" according to the sign "negative value" of "−1" indicating the inclination of the phase slip.

The phase shift unit 441 does not perform phase shift on the received signal data "d(n)" in which the phase slip does not occur. In FIGS. 2, 3, and 4, the phase shift unit 441 does not perform phase shift on the received signal data "d(n)" at the symbol times "t0", "t2", "t3", and "t5" at which the phase slip detection information "l(n)" is "0". The phase shift unit 441 outputs phase-shifted received signal data "d(n)+l(n)" to the remainder processing unit 442.

The remainder processing unit 442 calculates, for each symbol time index "n", a remainder obtained by dividing a difference between the received signal data "d(n)+l(n)" input from the phase shift unit 441 which is the second pass and the received signal data "d(n−1)" input from the delay processing unit 440 that is the first pass by a divisor "y" which is a value of M in the M-ary phase shift keying. That is, the remainder processing unit 442 executes a differential remainder arithmetic operation (differential modulo arithmetic operation) represented in Equation (1).

$$d'(n) = \text{Mod}((d(n)+l(n))-d(n-1), y) \quad (1)$$

Here, "d'" is a result of a differential remainder (differential decoding), "d" is the received signal data, "l" is the phase slip detection information, "y" is the divisor, and "n" is the index of the symbol time. For example, when the M-ary phase shift keying is QPSK, "y" is 4. "Mod" indicates a differential remainder function. "d'", "d", "l", and "y" are expressed in, for example, decimal numbers.

Now, an operation example of the communication system 1 will be described. FIG. 5 is a flowchart illustrating an operation example of the communication system 1. The detection unit 43 detects the occurrence of the phase slip in the phase estimation values of the time-series received symbol data (step S101). The detection unit 43 determines the inclination of the detected phase slip (step S102). The delay processing unit 440 delays the received signal data "d(n)" obtained from the time-series received symbol data by one symbol time interval "Ts", and generates the received signal data "d(n−1)" (step S103). Among the pieces of received signal data "d(n)" obtained from the time-series received symbol data, the phase shift unit 441 performs phase shift on only the received signal data of the symbol time at which the occurrence of the phase slip is detected according to the inclination of the phase slip only in a period in which one symbol time interval "Ts" elapses, thereby generating the received signal data "d(n)+l(n)" (step S104). The remainder processing unit 442 derives the remainder "d'(n)" obtained by dividing the difference between the received signal data "d(n)+l(n)" and the received signal data "d(n−1)" by the divisor "y" (step S105).

As described above, the reception apparatus 4 according to the first embodiment includes the detection unit 43, the delay processing unit 440, the phase shift unit 441, and the remainder processing unit 442. The detection unit 43 detects the occurrence of the phase slip in the phase estimation values of the time-series received symbol data, and determines the inclination of the phase slip. The delay processing unit 440 delays the received signal data "d(n)" obtained from the time-series received symbol data by one symbol time interval "Ts", and generates the received signal data "d(n−1)". The received signal data "d(n−1)" is an example of first received signal data. Among the pieces of received signal data "d(n)" obtained from the time-series received symbol data, the phase shift unit 441 performs phase shift only on the received signal data of the symbol time at which the occurrence of the phase slip is detected according to the inclination of the phase slip only in a period in which one symbol time interval "Ts" elapses, thereby generating the received signal data "d(n)+l(n)". The received signal data "d(n)+l(n)" is an example of second received signal data. The remainder processing unit 442 derives the remainder "d'(n)" obtained by dividing the difference between the received signal data "d(n)+l(n)" and the received signal data "d(n−1)" by the divisor "y" as in Equation (1).

As stated above, the phase shift unit 441 executes the phase shift processing only on a part of the received signal data in which the phase slip occurs.

Accordingly, the reception apparatus 4 according to the first embodiment allows the differential decoding unit 44 to execute the phase shift processing only on a part of the received signal data, thereby eliminating the limitation of the estimable range of the phase estimation value without making continuous the phase estimation values of the received symbol data. The reception apparatus 4 may not execute sequential arithmetic operations of making continuous the phase estimation values for all the pieces of received symbol data.

Second Embodiment

A second embodiment differs from the first embodiment in that the reception apparatus executes optical coherent reception. In the second embodiment, differences from the first embodiment will be described.

Figure 6:
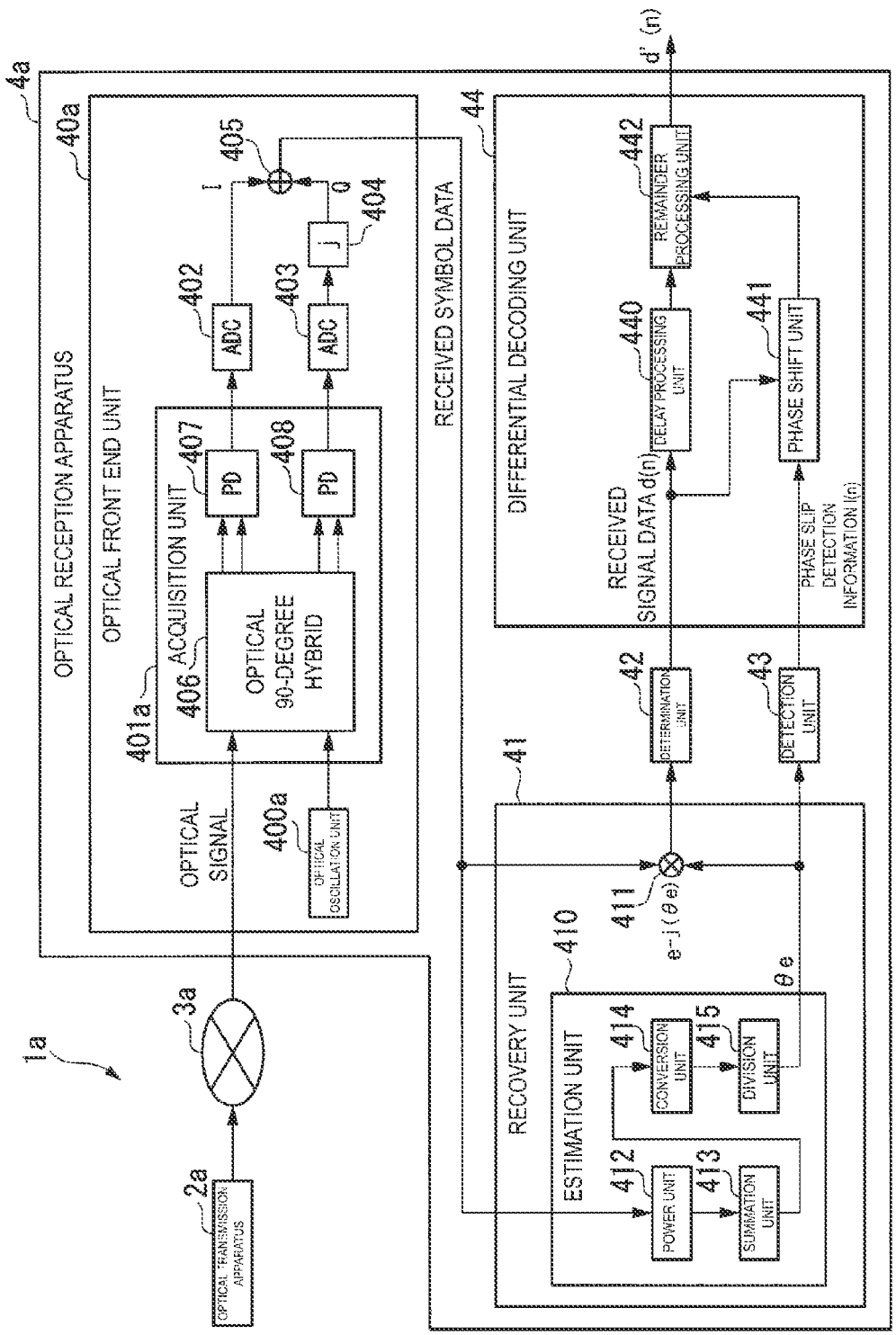
FIG. 6 is a diagram illustrating a configuration example of a communication system according to a second embodiment.

FIG. 6 is a diagram illustrating a configuration example of an optical communication system 1a. The optical communication system 1a is an optical digital communication system that executes M-ary phase shift keying. In the optical communication system 1a illustrated in FIG. 6, components identical to the components in the communication system 1 according to the first embodiment illustrated in FIG. 1 are assigned by the identical reference signs, and descriptions thereof will be appropriately omitted. The optical communication system 1a includes an optical transmission apparatus 2a, an optical communication line 3a, and an optical reception apparatus 4a. The optical transmission apparatus 2a is an optical phase shift keying transmitter. The optical reception apparatus 4a is an optical coherent receiver. The optical communication line 3a is, for example, an optical fiber.

The optical reception apparatus 4a includes an optical front end unit 40a, a recovery unit 41, and a differential decoding unit 44. The optical front end unit 40a receives an optical signal transmitted from the optical transmission apparatus 2a. The optical front end unit 40a generates received symbol data containing an unnecessary phase component from the received optical signal. The optical front end unit 40a includes an optical oscillation unit 400a, an acquisition unit 401a, an ADC 402, an ADC 403, a complex processing unit 404, and a combination unit 405. Hereinafter, the optical signal received as described above is referred to as a "received optical signal".

The optical oscillation unit 400a is, for example, a laser oscillator. The optical oscillation unit 400a outputs a laser beam having a predetermined frequency to the acquisition unit 401a. The acquisition unit 401a generates a received optical signal of an in-phase component and a received optical signal of a quadrature component by multiplexing the laser beam having the predetermined frequency and the received optical signal.

The acquisition unit 401a includes an optical 90-degree hybrid 406, a PD 407, and a PD 408. The optical 90-degree hybrid 406 generates a received optical signal of a quadrature component and a received optical signal of an in-phase component by multiplexing the laser beam having the predetermined frequency and the received optical signal. The PD 407 and the PD 408 are photodiodes. The PD 407 outputs an analog signal corresponding to the received optical signal of the in-phase component to the ADC 402. The PD 408 outputs an analog signal corresponding to the received optical signal of the quadrature component to the ADC 403.

Similar to the first embodiment, among the pieces of received signal data "d(n)" obtained from the time-series received symbol data, the phase shift unit 441 performs phase shift only on the received signal data at the symbol time at which the occurrence of the phase slip is detected according to the inclination of the phase slip only in a period in which one symbol time interval "Ts" elapses, thereby generating the received signal data "d(n)+l(n)".

Accordingly, the optical reception apparatus 4a (the optical coherent receiver) according to the second embodiment allows the differential decoding unit 44 to execute the phase shift processing only on a part of the received signal data, thereby eliminating the limitation of the estimable range of the phase estimation value without making continuous the phase estimation values of the received symbol data. The optical reception apparatus 4a may not execute sequential arithmetic operations of making continuous the phase estimation values for all the pieces of received symbol data.

Third Embodiment

In a third embodiment, the reception apparatus receives a quadrature amplitude modulation (QAM) signal. In the third embodiment, differences from the first embodiment will be mainly described.

Figure 7:
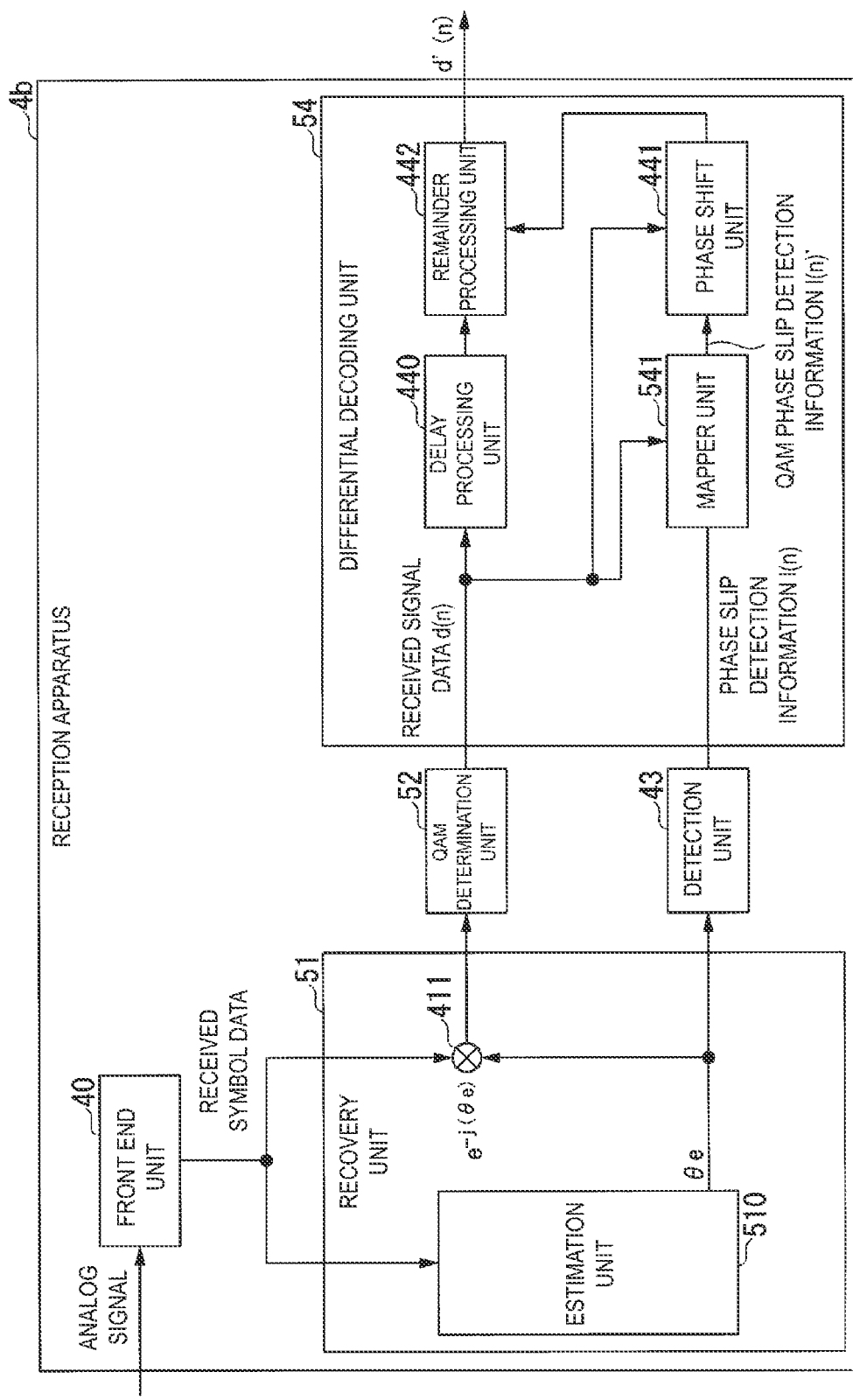
FIG. 7 is a block diagram illustrating a configuration example of a reception apparatus according to a third embodiment.

A communication system according to the third embodiment has a configuration using a reception apparatus 4b illustrated in FIG. 7 instead of the reception apparatus 4 of the communication system 1 according to the first embodiment illustrated in FIG. 1. The analog signal transmitted by the transmission apparatus 2 is a QAM signal.

FIG. 7 is a block diagram illustrating a configuration example of the reception apparatus 4b. In the reception apparatus 4b illustrated in FIG. 7, components identical to the components of the reception apparatus 4 according to the first embodiment illustrated in FIG. 1 are assigned by the identical reference signs, and detailed descriptions thereof will be omitted. The reception apparatus 4b includes a front end unit 40, a recovery unit 51, a QAM determination unit 52, a detection unit 43, and a differential decoding unit 54.

The front end unit 40 receives an analog signal. This analog signal is a QAM signal. The front end unit 40 generates received symbol data from the received analog signal by processing similar to the processing of the first embodiment. Hereinafter, the received symbol data generated from the QAM signal is described as QAM received symbol data.

The recovery unit 51 differs from the recovery unit 41 included in the reception apparatus 4 according to the first embodiment in that the recovery unit includes an estimation unit 510 instead of the estimation unit 410. The estimation unit 510 acquires, from the QAM received symbol data, the time-series phase estimation value "θe" in which the phase estimation value becomes discontinuous due to the phase slip by using a method such as QPSK partitioning (see Non Patent Document 1). The estimation unit 510 outputs the obtained phase estimation value "θe". The multiplication unit 411 outputs the received symbol data obtained by multiplying the QAM received symbol data by a complex number "exp(−jθe)" to the QAM determination unit 52.

The QAM determination unit 52 acquires the received symbol data from the multiplication unit 411. The QAM determination unit 52 executes the identification processing (QAM symbol determination processing) on the acquired received symbol data. That is, the QAM determination unit 52 generates the received signal data "d(n)" which is data associated with the M-ary received symbol data in advance. Here, "n" is the index of the symbol time, and the received signal data "d(n)" is expressed in, for example, a decimal number. The QAM determination unit 52 outputs the generated received signal data "d(n)" to the differential decoding unit 54.

The detection unit 43 acquires the phase estimation value "θe" from the recovery unit 51. Similar to the first embodiment, the detection unit 43 generates the phase slip detection information "l(n)" of each symbol time based on the phase estimation value "θe" of each symbol time.

The differential decoding unit 54 differs from the differential decoding unit 44 included in the reception apparatus 4 according to the first embodiment in that a mapper unit (mapper) 541 is further included. The mapper unit 541 generates QAM phase slip detection information "l(n)'" based on the phase slip detection information "l(n)" acquired from the detection unit (detector) 43 and the received signal data "d(n)" acquired from the QAM determination unit 52. The mapper unit 541 generates "l(n)'" corresponding to the shift phase value "+π/2" when the phase slip detection information "l(n)" is "+1" (positive value) for each constellation point belonging to a QPSK ring among the pieces of received symbol data, and generates "l(n)'" corresponding to the shift phase value "−π/2" when the phase slip detection information "l(n)" is "−1" (negative value). The QPSK ring is a circle that has identical amplitudes with an origin of an IQ plane as a center, and pass through constellation points having identical amplitudes at the phases "−3π/4", "π/4", "π/4", and "3π/4". The mapper unit 541 outputs the QAM phase slip detection information "l(n)'" to the phase shift unit 441.

Among the time-series received signal data "d(n)", the phase shift unit 441 performs phase shift on only the received signal data "d(n)" in which the phase slip occurs at the bit level based on the QAM phase slip detection information "l(n)'" only in a period in which one symbol time interval "Ts" elapses. That is, the phase shift unit 441 rewrites the received signal data "d(n)" obtained from the received symbol data to the received signal data "d(n)+l(n)".

The remainder processing unit 442 acquires the received signal data "d(n)+l(n)'" from the phase shift unit 441, and acquires the received signal data "d(n−1)" from the delay processing unit 440. The remainder processing unit 442 executes the differential remainder arithmetic operation (differential modulo arithmetic operation) represented by Equation (1) by using the received signal data "d(n)+l(n)'" instead of the received signal data "d(n)+l(n)". Here, "y" in Equation (1) is the value of M in an M-QAM signal. For example, "y" is 16 in the case of 16QAM.

Figure 8:
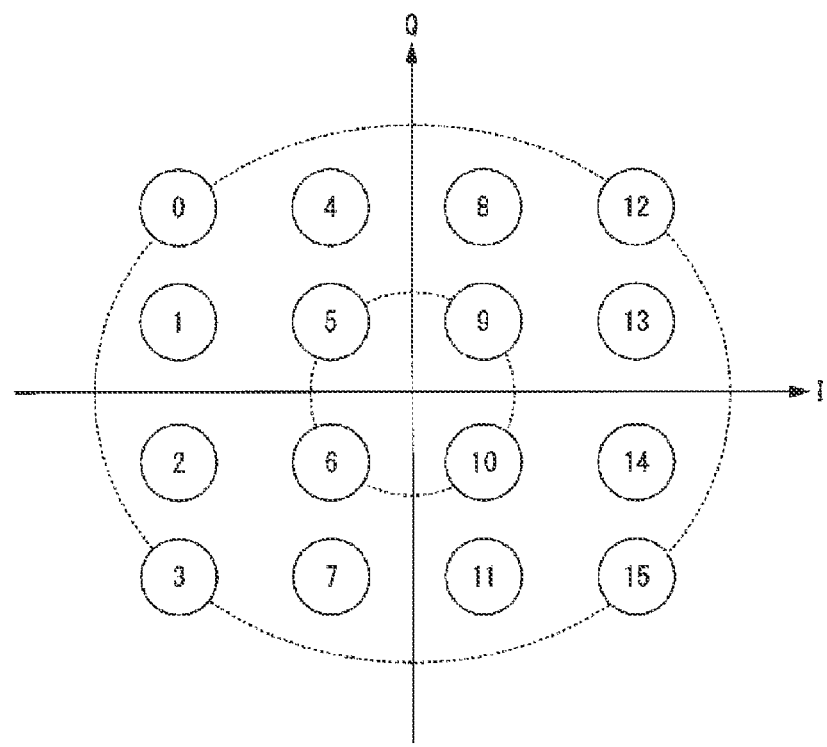
FIG. 8 is a diagram illustrating constellation points of 16QAM according to the third embodiment.

FIG. 8 is a diagram illustrating an example of the constellation points of 16QAM. In FIG. 8, the constellation points [0 1 2 3 4 5 6 7 8 9 10 11 12 13 14 15] of the 16QAM in a signal space diagram are illustrated. The constellation points belonging to the QPSK rings are the constellation points "0", "3", "12", and "15", and the constellation points "5", "6", "9", and "10".

In the case of 16QAM defined in FIG. 8, the QAM phase slip detection information "l(n)'" for the constellation points [0 1 2 3 4 5 6 7 8 9 10 11 12 13 14 15] is a value described below.

When the phase slip detection information "l(n)" is "+1" (positive value), the QAM phase slip detection information "l(n)'" is the following Equation (2).

$$l(n)'=[4\ 0\ 0\ 3\ 0\ 12\ 1\ 0\ 0\ 15\ 4\ 0\ 13\ 0\ 0\ 12] \quad (2)$$

When the phase slip detection information "l(n)" is "1" (negative value), the QAM phase slip detection information "l(n)'" is the following Equation (3).

$$l(n)'=[-3\ 0\ 0\ -12\ 0\ -1\ -4\ 0\ 0\ -12\ -15\ 0\ -4\ 0\ 0\ -13] \quad (3)$$

The QAM phase slip detection information "l(n)'" is defined by a value corresponding to the shift phase value "±π/2" from a phase-slipped constellation point among the pieces of received symbol data (see FIG. 8). In the aforementioned example, when the point 0 is phase-slipped to the point 12, the QAM phase slip detection information "l(n)'" is set to "4." When the point 0 is phase-slipped to point 3, the QAM phase slip detection information "l(n)'" is set to "−3".

According to the present embodiment, the QAM determination unit 52 generates the received signal data "d(n)" by performing the QAM symbol determination on the time-series received symbol data generated from the QAM signal. The QAM determination unit 52 is an example of a determination unit. The detection unit 43 detects the occurrence of the phase slip in the phase estimation value of the QAM received symbol data based on the phase estimation value "θe" of the received symbol data. The mapper unit 541 generates the QAM phase slip detection information "l(n)'" corresponding to the shift phase value for the phase-slipped constellation point based on the received signal data "d(n)" generated by the QAM determination unit 52 and the phase slip detection information "l(n)" indicating the occurrence of the phase slip detected by the detection unit 43. The delay processing unit 440 delays the received signal data "d(n)" by one symbol time interval "Ts", and generates the received signal data "d(n−1)". The received signal data "d(n−1)" is an example of first received signal data. The phase shift unit 441 adds the QAM phase slip detection information "l(n)'" to only the received signal data of the symbol time at which the occurrence of the phase slip is detected among the pieces of received signal data "d(n)" only in a period in which one symbol time interval "Ts" elapses. Accordingly, the phase-shifted received signal data "d(n)+l(n)'" is generated. The received signal data "d(n)+l(n)'" is an example of the second received signal data. The remainder processing unit 442 derives the remainder "d'(n)" by dividing the difference between the received signal data "d(n)+l(n)'" and the received signal data "d(n−1)" by the divisor "y" as in Equation (1).

Accordingly, the reception apparatus 4b according to the third embodiment can eliminate the limitation of the estimable range of the phase estimation value without making continuous the phase estimation values of the received symbol data for the QAM received symbol data.

Figure 9:
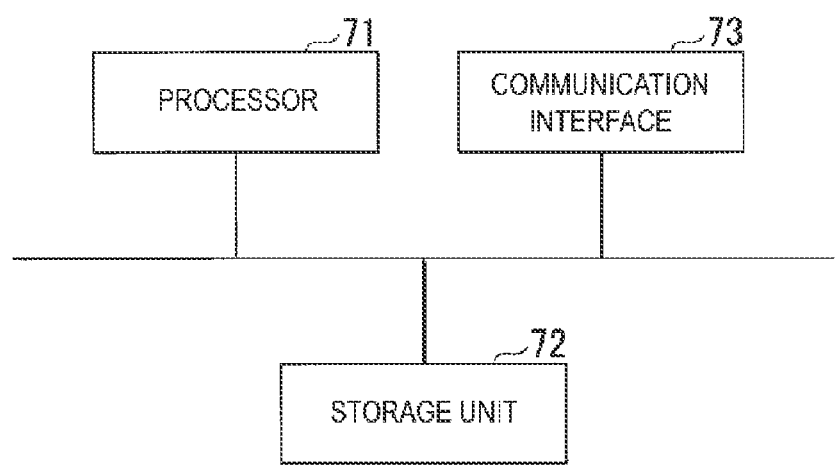
FIG. 9 is a diagram illustrating a hardware configuration of the reception apparatus according to the first embodiment.

A hardware configuration when the reception apparatus 4, the optical reception apparatus 4a, and the reception apparatus 4b perform software processing will be described. FIG. 9 is an apparatus configuration diagram illustrating a hardware configuration example of the reception apparatus 4. The reception apparatus 4 includes a processor 71, a storage unit 72, and a communication interface 73. The processor 71 may be, for example, a CPU or a GPU. A plurality of the processor 71 may be provided. The processor 71 implements the recovery unit 41, the determination unit 42, the detection unit 43, and the differential decoding unit 44 of FIG. 1 by reading programs from the storage unit 72 and executing the programs. The storage unit 72 is various kinds of memories, storage devices, and the like. The storage unit 72 stores programs for executing processing of the recovery unit 41, the determination unit 42, the detection unit 43, and the differential decoding unit 44, and the like. The storage unit 72 further includes a work area when the processor 71 executes various programs and the like. The communication interface 73 is communicatively connected to other apparatuses, and implements the front end unit 40 of FIG. 1. Note that, the programs can be recorded on a recording medium or may be provided via a network.

The hardware configuration of the optical reception apparatus 4a is also similar to the hardware configuration of the reception apparatus 4 illustrated in FIG. 9. However, in the case of the optical reception apparatus 4a, the communication interface 73 implements the optical front end unit 40a of FIG. 6.

The hardware configuration of the reception apparatus 4b is also similar to the hardware configuration of the reception apparatus 4 illustrated in FIG. 9. However, in the case of the reception apparatus 4b, the processor 71 implements the recovery unit 51, the QAM determination unit 52, the detection unit 43, and the differential decoding unit 54 of FIG. 7. The storage unit 72 stores programs for executing processing of the recovery unit 51, the QAM determination unit 52, the detection unit 43, and the differential decoding unit 54, and the like.

The embodiments of the present disclosure have been described above in detail with reference to the drawings. However, specific configurations are not limited to those embodiments, and include any design or the like within the scope not departing from the gist of the present disclosure.

INDUSTRIAL APPLICABILITY

The present disclosure is applicable to a system for executing wireless communication or optical communication.

REFERENCE SIGNS LIST

1 Communication system
1a Optical communication system
2 Transmission apparatus
2a Optical transmission apparatus 3 Communication line
3a Optical communication line
4 Reception apparatus
4a Optical reception apparatus
4b Reception apparatus
40 Front end unit
40a Optical front end unit
41 Recovery unit
42 Determination unit
43 Detection unit
44 Differential decoding unit
51 Recovery unit
52 QAM determination unit
54 Differential decoding unit
71 Processor
72 Storage unit
73 Communication interface
100 Mark
400 Oscillation unit
400a Optical oscillation unit
401 Acquisition unit
401a Acquisition unit
402 A/D conversion unit
403 A/D conversion unit
404 Complex processing unit
405 Combination unit
406 Optical 90-degree hybrid
407 Photodiode
408 Photodiode
410 Estimation unit
411 Multiplication unit
412 Power unit
413 Summation unit
414 Conversion unit
415 Division unit
440 Delay processing unit
441 Phase shift unit
442 Remainder processing unit
510 Estimation unit
541 Mapper unit

The invention claimed is:

1. A reception apparatus comprising:
a deteter configured to detect occurrence of a phase slip in a phase estimation value of time-series received symbol data, and determine an inclination of the phase slip;
a delay processor configured to generate first received signal data obtained by delaying received signal data obtained from the time-series received symbol data by one symbol time interval;
a phase shifter configured to generate second received signal data obtained by performing phase shift according to the inclination, only in a period in which one symbol time elapses, on only the received signal data of a symbol time at which the occurrence of the phase slip is detected among pieces of the received signal data obtained from the time-series received symbol data; and
a remainder processor configured to derive a remainder of a difference between the second received signal data and the first received signal data,
wherein each of the detector, the delay processor, the phase shifter, and the remainder processor is implemented by:
i) computer executable instructions executed by at least one processor,
ii) at least one circuitry or
iii) a combination of computer executable instructions executed by at least one processor and at least one circuitry.

2. The reception apparatus according to claim 1, wherein the detector is configured to detect the occurrence of the phase slip based on a fact that the phase estimation value of the received symbol data is changed by a predetermined threshold value or more.

3. The reception apparatus according to claim 1, wherein the detector is configured to determine the inclination of the phase slip based on signs of the phase estimation values of a plurality of pieces of the received symbol data including pieces of the received symbol data at the symbol time at which the occurrence of the phase slip is detected and at a symbol time immediately previous to the symbol time at which the occurrence of the phase slip is detected.

4. A reception apparatus comprising:
a determiner configured to generate received signal data by performing quadrature amplitude modulation (QAM) symbol determination on time-series received symbol data generated from a QAM signal;
a detector configured to detect occurrence of a phase slip in a phase estimation value of the received symbol data;
a mapper configured to generate QAM phase slip detection information corresponding to a shift phase value for a phase-slipped constellation point based on the received signal data and information indicating the occurrence of the phase slip detected by the detector;
a delay processor configured to generate first received signal data obtained by delaying the received signal data by one symbol time interval;
a phase shifter configured to generate phase-shifted second received signal data by adding the QAM phase slip detection information to only the received signal data of a symbol time at which the occurrence of the phase slip is detected only in a period in which one symbol time interval elapses; and
a remainder processor configured to derive a remainder of a difference between the second received signal data and the first received signal data.

5. A reception method executed by a reception apparatus, the method comprising:
detecting occurrence of a phase slip in a phase estimation value of time-series received symbol data, and determining an inclination of the phase slip;
generating first received signal data obtained by delaying received signal data obtained from the time-series received symbol data by one symbol time interval;
generating second received signal data obtained by performing phase shift according to the inclination, only in a period in which one symbol time interval elapses, only on the received signal data of a symbol time at which the occurrence of the phase slip is detected among pieces of the received signal data obtained from the time-series received symbol data; and
deriving a remainder of a difference between the second received signal data and the first received signal data.

6. A reception method executed by a reception apparatus, the method comprising:
generating received signal data by performing quadrature amplitude modulation (QAM) symbol determination on time-series received symbol data generated from a QAM signal;
detecting occurrence of a phase slip in a phase estimation value of the received symbol data;

generating QAM phase slip detection information corresponding to a shift phase value for a phase-slipped constellation point based on the received signal data and information indicating the occurrence of the phase slip;

generating first received signal data obtained by delaying the received signal data by one symbol time interval;

generating phase-shifted second received signal data by adding the QAM phase slip detection information to only the received signal data of a symbol time at which the occurrence of the phase slip is detected only in a period in which one symbol time interval elapses; and deriving a remainder of a difference between the second received signal data and the first received signal data.

7. A program causing a computer to operate as functional units included in the reception apparatus according to claim 1.

* * * * *